United States Patent
Bauer et al.

(10) Patent No.: US 11,408,330 B2
(45) Date of Patent: Aug. 9, 2022

(54) METHOD OF OPERATING A FOUR STROKE INTERNAL COMBUSTION ENGINE SYSTEM

(71) Applicant: VOLVO TRUCK CORPORATION, Gothenburg (SE)

(72) Inventors: Martin Bauer, Anderslöv (SE); Fredrik Rahm, Hörby (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/256,482

(22) PCT Filed: Jun. 29, 2018

(86) PCT No.: PCT/EP2018/067636
§ 371 (c)(1),
(2) Date: Dec. 28, 2020

(87) PCT Pub. No.: WO2020/001788
PCT Pub. Date: Jan. 2, 2020

(65) Prior Publication Data
US 2021/0131341 A1    May 6, 2021

(51) Int. Cl.
| F02B 37/04 | (2006.01) |
| F02B 37/00 | (2006.01) |
| F02B 39/10 | (2006.01) |
| F02D 29/06 | (2006.01) |
| F02D 41/00 | (2006.01) |
| F02M 35/10 | (2006.01) |
| F02D 9/02 | (2006.01) |

(52) U.S. Cl.
CPC .............. *F02B 37/04* (2013.01); *F02B 37/00* (2013.01); *F02B 39/10* (2013.01); *F02D 9/02* (2013.01);
(Continued)

(58) Field of Classification Search
CPC .......... F02B 37/04; F02B 37/00; F02B 39/10; F02B 33/36; F02B 33/38; F02D 9/02;
(Continued)

(56) References Cited

U.S. PATENT DOCUMENTS 6,938,420 B2 *   9/2005   Kawamura ......... F02D 41/0007
                                                  60/612
10,054,038 B2 *  8/2018   Leroy ..................... F02B 37/04
                        (Continued)

FOREIGN PATENT DOCUMENTS

DE    19928523 A1    1/2001
EP    1992808 A1    11/2008
                        (Continued)

OTHER PUBLICATIONS

International Search Report and Written Opinion dated Jul. 24, 2019 in corresponding International PCT Application No. PCT/EP2018/067636, 10 pages.
(Continued)

*Primary Examiner* — J. Todd Newton
(74) *Attorney, Agent, or Firm* — Venable LLP; Jeffri A Kaminski

(57) ABSTRACT

The invention relates to a method of operating a four stroke internal combustion engine system (1), the engine system (1) comprising:—a four stroke internal combustion engine (2) provided with an intake duct (5),—a turbo compressor (6") arranged to compress intake flow in the intake duct (5), and—a displacement machine (7) provided in the intake duct (5) downstream the turbo compressor (6"), wherein the displacement machine (7) is arranged to displace intake flow from an inlet to an outlet thereof. The method comprises the step of: operating the displacement machine (7) in a first mode where a pressure ratio (PR) given by a pressure at the outlet of the displacement machine (7) divided by a pressure at the inlet of the displacement machine (7) is substantially equal to 1. The invention also relates to a four stroke internal combustion engine system arranged to be operated by the above method.

19 Claims, 3 Drawing Sheets

(51) Int. Cl.
*F02M 35/12* (2006.01)
*F04C 2/12* (2006.01)

(52) U.S. Cl.
CPC ......... *F02D 29/06* (2013.01); *F02D 41/0007* (2013.01); *F02M 35/10295* (2013.01); *F02M 35/1205* (2013.01); *F04C 2/126* (2013.01); *F02D 2009/0283* (2013.01); *F02D 2200/0406* (2013.01); *F04C 2240/40* (2013.01)

(58) Field of Classification Search
CPC ................ F02D 29/06; F02D 41/0007; F02D 2009/0283; F02D 2200/0406; F02M 35/10295; F02M 35/1205; F04C 2/126; F04C 2240/40
USPC .......................................................... 60/612
See application file for complete search history.

(56) References Cited

U.S. PATENT DOCUMENTS

| | | | | |
|---|---|---|---|---|
| 2004/0194466 | A1* | 10/2004 | Kawamura | ............. F02B 33/44 60/612 |
| 2008/0288157 | A1* | 11/2008 | Winsor | ................... F02B 33/38 701/103 |
| 2013/0090832 | A1 | 4/2013 | Bevan et al. | |
| 2015/0240826 | A1* | 8/2015 | Leroy | ................... F02D 23/005 415/1 |
| 2015/0247447 | A1 | 9/2015 | Leroy et al. | |
| 2015/0315960 | A1 | 11/2015 | Thomas et al. | |
| 2016/0237880 | A1* | 8/2016 | Ouwenga | ................ F02B 39/10 |
| 2016/0245155 | A1 | 8/2016 | Iwata | |
| 2017/0067393 | A1* | 3/2017 | Xiao | ................... F02D 41/0007 |
| 2018/0045109 | A1* | 2/2018 | Fortini | .................... F02B 39/10 |

FOREIGN PATENT DOCUMENTS

| | | |
|---|---|---|
| FR | 2949140 A1 | 2/2011 |
| JP | 2012136957 A | 7/2012 |
| WO | 0073639 A1 | 12/2000 |
| WO | 2015066060 A1 | 5/2015 |

OTHER PUBLICATIONS

International Preliminary Report on Patentability dated Jul. 15, 2020 in corresponding International PCT Application No. PCT/EP2018/067636, 21 pages.

* cited by examiner

METHOD OF OPERATING A FOUR STROKE INTERNAL COMBUSTION ENGINE SYSTEM

CROSS-REFERENCE TO RELATED APPLICATIONS

This application is a U.S. National Stage application of PCT/EP2018/067636, filed Jun. 29, 2018, and published on Jan. 2, 2020, as WO 2020/001788 A1, all of which is hereby incorporated by reference in its entirety.

TECHNICAL FIELD

The invention relates to a method of operating a four stroke internal combustion engine system. The invention also relates to a four stroke internal combustion engine system, a vehicle provided with such an engine system, a control unit and software related devices for controlling of the method.

The invention is of particular interest for relatively small internal combustion engines (Otto or Diesel) having up to three or four cylinders and is therefore mainly of interest for smaller vehicles or for hybrid engines in heavy-duty vehicles, such as trucks, busses and construction equipment. The invention may however be of interest also in other applications.

BACKGROUND

Internal combustion engines for propulsion of vehicles are commonly provided with a turbocharging arrangement where exhaust gas drives a turbine that drives a compressor that in turn compresses an intake flow fed to the engine. The intake system occasionally experiences pulses, i.e. variations/oscillations in intake pressure/flow, which have a negative effect on the function of the turbo compressor.

US2017/0067393A1 addresses this problem and explains that a turbo compressor may be prone to oscillate if a large change in air flow through the compressor occurs, such as a sudden release of an accelerator pedal from a higher driver demand to a lower driver demand that, as a result of closing the throttle quickly, may cause intake flow flowing through the compressor to decrease so that the compressor begins to oscillate. US2017/0067393A1 proposes to reduce turbo compressor oscillations by arranging a second compressor downstream the turbo compressor in the air inlet and adjusting air pressure in the air inlet upstream of the turbo compressor, for instance by adjusting an intake flow through the second compressor to decrease pressure at an outlet of the second compressor in response to a pressure increase at an outlet of the turbo compressor.

However, the inventors of the present invention have noted that a solution according to US2017/0067393A1 does not eliminate or significantly reduce the pulses in the air intake system, at least not for all operational conditions.

There is thus still a need for improvements with regard to reduction of pulses/oscillations in the intake system of a four stroke internal combustion engine provided with a turbocharging arrangement.

SUMMARY

An object of the present invention is to provide a method of operating a four stroke internal combustion engine system which handles pulses/oscillations in an efficient manner and thereby enables a more reliable and efficient operation of a turbo arrangement of such an engine. According to different aspects of the invention this object is achieved by the method, engine system, vehicle, control unit and software related devices as defined in the independent claims.

According to a first aspect the invention relates to a method of operating a four stroke internal combustion engine system, the engine system comprising: a four stroke internal combustion engine provided with an intake duct; a turbo compressor arranged to compress an intake flow in the intake duct; and a displacement machine provided in the intake duct downstream the turbo compressor, wherein the displacement machine is arranged to displace intake flow from an inlet to an outlet thereof.

The intake flow may include a mixture of gases such as air or air mixed with gas from one or more of exhaust gas recirculation, crankcase ventilation and nitrous oxide systems etc. The intake flow may moreover carry particles such as fuel, water and urea for NOx reduction etc.

The method is characterized in that it comprises the step of: operating the displacement machine in a first mode where a pressure ratio (PR) given by a pressure at the outlet of the displacement machine divided by a pressure at the inlet of the displacement machine is substantially equal to 1, i.e. the displacement machine is in this step operated such that the pressure differential between the inlet and the outlet of the displacement machine is essentially zero.

The invention is partly based on the inventor's realization that the pulses/oscillations that have a negative effect on the function of the turbo compressor are not necessarily a result of changes in the flow through the compressor but instead that these unwanted pulses/oscillations are generated in the engine. Exactly how the pulses are generated and transferred upstream in the intake duct may be difficult to acquire full understanding of but it has to do with the opening and closing of the intake valves. These pulses are especially problematic at lower revs (i.e. at lower engine speeds with a lower number of revolutions per minute) and in engines with large displacement and fewer cylinders, typically three cylinders or less where there are time periods during which no intake valve is open, but also for four cylinders where there are instants where no intake valve is open, and to some degree also for five cylinders or more. The pulsations cause instability in the turbo compressor in a way leading to surge phenomena to occur at flow rates that otherwise are running smooth.

By arranging the displacement machine, such as a rotary displacement unit of roots blower type, between the engine and the turbo compressor in the intake duct, the pulses are prevented from moving upstream from the engine to the turbo compressor. The displacement machine thus acts as a pulse dampener and eliminates the pressure fluctuations that otherwise would affect, as an example, the turbo compressor, in a negative way. This stabilizes the operation of the turbo compressor in general, which in turn improves the overall engine performance. Other systems such as non-direct fuel injection systems or even carburetors are also disturbed by such pulses. By arranging the displacement machine between the engine and the turbo compressor in the intake duct, and by injecting and dosing fuel upstream the displacement machine, dosing of fuel may be performed greater accuracy as injection takes place in a virtually pulse-free environment. Additionally the displacement machine will in such configuration also improve mixing of the mixture.

Operation of the displacement machine in a first mode at PR=1 can be performed in any operation mode of the internal combustion engine. Such modes includes typically i) a normal steady state-like operation mode of the engine where there are no significant transients with regard to desired changes in e.g. engine speed or load so that there are no significant changes desired with regard to magnitude of the intake flow fed to the engine etc., ii) a throttling mode where a desired magnitude of an intake flow to be fed to the engine is significantly smaller than the intake flow fed to the engine during the normal operation mode, such as when the accelerator pedal is significantly released, and iii) a boosting mode where a desired magnitude of an intake flow to be fed to the engine is significantly larger than the intake flow fed to the engine during the normal operation mode, such as when the accelerator pedal is significantly pressed down. The normal steady state-like mode includes different sub-modes corresponding to different levels of steady state-like operation.

By allowing selection of a drive level of the displacement machine depending on engine operating mode (and sub-mode), e.g. by selecting the rotational drive speed of a rotary displacement machine depending on engine operating mode, the displacement machine is useful not only for dampening pulses but also for increasing the efficiency of the entire internal combustion engine system, as will be further explained below. That the drive level of the displacement machine can be selected means that the drive level (or power, drive speed, etc.) can be varied and that it is controllable.

During normal operation of the engine, the displacement machine is preferably driven so that the inlet and outlet pressures are (close to) equal (which means that the volume flow rate is the same at both inlet and outlet). That is, during normal operation of the engine, i.e. steady-state operation with no significant desire of sudden large changes in intake flow, the displacement machine will primarily run as a dampening device without affecting the pressure in the intake duct.

Because the pulses are dampened out by the displacement machine, the operating point for the turbo compressor (in a turbo compressor map) will be in a stable position, in contrast to a varying position when the turbo compressor is exposed to pulses. Eliminating such variations leads to improvements in compressor efficiency since it is allowed to operate in a steady state. This can be used for further optimization of the turbo compressor and thus an even higher efficiency.

That the pressure ratio is "substantially equal to 1" means in this case at least within the interval 0.9-1.1 but preferably 0.95-1.05 or even closer to 1.

The displacement machine may be electrically driven, i.e. an electric motor may be arranged to drive movable parts, typically rotatable members, of the displacement machine. This makes it easy to vary the drive level and makes the entire engine system very flexible. Alternatively the displacement machine may be belt, chain or gear driven with a variable gear ratio, connected to the crankshaft of the engine. This makes also the system flexible, but it may be more difficult to make the driving as reliable as electric driving. A further variant is that the displacement machine is hydraulically driven via hydraulic pump and motor.

The displacement machine may be arranged upstream or downstream a charge flow cooler if such a device forms part of the engine system. Various by-pass options may be arranged in the intake duct. Although a main idea of the disclosed system is to pass the entire intake flow through the displacement machine a by-pass of the displacement machine may be arranged for particular operating conditions, such as to allow operation of the engine system also in case of malfunctioning of the displacement machine.

With a variable speed drive of the displacement machine it may be possible to achieve extraordinary turbo compressor efficiencies; possibly through low or, even better, high solidity vaned diffusors.

Use of displacement machines in intake systems of internal combustion engines is known as such. However, often the machine is arranged upstream the turbo compressor, and generally it is used only for improving boosting. In this case the machine is used as a pulse dampener/eliminator, which is of particular interest for e.g. engines with three cylinders where there are periods of no inlet valve open and thus no flow. Further, the concept of having an engine with very few cylinders together with heavy turbocharging is not common, so this field is under development. An interesting application for this invention is hybrid engines for heavy-duty vehicles.

In an embodiment the method comprises the step of switching operation mode of the displacement machine and operating the displacement machine in a second mode (energy recovery and/or throttling mode) where the pressure ratio (PR) is below 1. This is typically a response to a reception of a signal in a control unit that a desired magnitude of an intake flow to be fed to the engine is significantly smaller than the intake flow fed to the engine during the normal operation mode.

At throttling, i.e. when the intake flow to the engine is restricted/reduced, the drive level of the displacement machine can be adapted to the desired throttling level of the engine and be set so that the pressure ratio is below 1, for instance around 0.5 or even down to perhaps 0.1 for certain engines or certain operational conditions. This means that the pressure at the inlet of the displacement machine is higher than at the outlet (and that the volume flow rate is higher at the outlet than at the inlet). Accordingly, this pressure difference can be used to drive the displacement machine and use the machine for recovering energy. If the displacement machine is electrically driven it is possible to let the displacement machine drive a generator for producing electricity that may be used in the engine system or onboard the vehicle or that may be used to charge an electric storage unit, such as a battery. Alternatively, the displacement machine may be connected mechanically or via hydraulic means (pump, motor, etc.) to the crank shaft so that the recovered energy can be used to add driving power to the crank shaft.

The recovered energy, i.e. the energy extracted from the higher pressure at the inlet side of the displacement machine, is "produced" by the turbo compressor, which in turn is driven by the exhaust turbine, which in turn is driven by exhaust gas from the engine, so at first sight it may seem like no overall gain. However, one thing is that a turbo waste gate can be used to a less extent, i.e. less amounts of exhaust gas needs to be tapped off from the turbine (for the purpose of reducing the power level of the turbo compressor). The otherwise tapped off energy forms part of the recovered energy. Another thing is that the pressure in the intake duct can be kept higher downstream the turbo compressor, i.e. higher than without the displacement machine, which is useful for allowing the turbo compressor to operate with a higher efficiency (in a better operating point in the compressor map). This has an overall positive effect on the efficiency of the entire engine system.

For an Otto engine the power of the engine can be controlled by operating the displacement machine with PR<1.

In an embodiment the method comprises the step of switching operation mode of the displacement machine and operating the displacement machine in a third mode (boost assist mode) where the pressure ratio (PR) is above 1. This is typically a response to a reception of a signal in the control unit that a desired magnitude of the intake flow to be fed to the engine is significantly larger than the intake flow fed to the engine during the normal operation mode, i.e. additional boost is desired.

If additional boost is desired, i.e. if there is a desire to feed more intake flow to the engine than during normal operational conditions, the drive level of the displacement machine is set so that the pressure ratio is above 1, for instance around 1.5 or even up to 2.0 for certain engines or operating conditions. This means that the pressure at the outlet of the displacement machine is higher than at the inlet. Accordingly, the displacement machine adds pressure as boost assist to the intake flow already pressurized in the turbo compressor. This can be used to increase the efficiency of the engine and/or to let the turbo compressor operate in a more favorable operating point where its efficiency is higher.

The drive level of the displacement machine is preferably controlled by a control unit that, together with a control system, is configured to control also the other parts of the internal combustion engine system. Such control units and systems are known as such. Typically, a control unit of this type makes use of various virtual maps and models, it has full information about the hardware of the system (type of engine, turbo compressor, valves, swept cylinder volume, etc.) and in combination with inputs from various sensors (torque, engine speed/revs, temperature, pressure, etc.) it "knows" or can calculate almost everything about/in the engine system. Since the control unit has full information on e.g. the engine operation mode, the desired intake flow to the engine, the actual intake flow to the engine, the pressure in the intake duct, mass flow rates, volume flow rates, how much intake flow that is displaced by the displacement machine per time unit at a certain drive level etc., it can control the drive level of the displacement machine without any special sensors dedicated for this particular purpose. It is only a matter of configuring the control unit to carry out the control properly. Also the actions related to the recovery of energy can be controlled by the control unit. Particular sensors, such as pressure sensors arranged upstream and/or downstream the displacement machine, may be used for controlling the displacement machine and/or checking its performance.

That a certain intake flow is "desired" typically means that it is desired by the control unit. The control units "desire" may of course be a reaction to, for instance, a desire from a driver (or a system for autonomous driving) who has sent some form of request to the control unit, for instance via the accelerator pedal.

In an embodiment the method comprises, when the displacement machine is operated in the second mode (energy recovery and/or throttling mode) and the engine preferably is operated in the throttling mode, the steps of: driving the displacement machine at least partly by means of the intake flow flowing through the intake duct, and recovering energy transferred from the intake flow to the displacement machine while driving the displacement machine. Preferably, the step of recovering the transferred energy further comprises one or more of the following steps: converting the recovered energy to electric energy and use the electric energy for driving electric equipment in the engine system or for charging an electric storage, such as a battery; using the recovered energy for adding driving power to a crankshaft of the engine.

In an embodiment the displacement machine is arranged to be driven at different drive levels by means of a controllable drive arrangement. A method step may then include a step of setting a drive level of the displacement machine in dependence on engine operating mode or desired engine operating mode. In this embodiment, the drive arrangement may also be configured to generate a power output when driven by the displacement machine.

In an embodiment the step of operating the displacement machine comprises a step of setting a drive level of an electric motor arranged to drive the displacement machine. This provides for an easy and flexible control. According to another embodiment, the drive arrangement might instead be mechanical or hydraulic.

In an embodiment wherein the displacement machine comprises at least one rotary member, the method includes a step of setting a drive speed of the rotary member.

In an embodiment the displacement machine is a rotary roots type blower having a pair of rotary members provided with meshing lobes. This type of displacement machine is believed to be the most suitable for this application because it dampens pulses effectively, it is easy to control its drive level, i.e. it is easy vary the speed of the rotary members, it works well for being driven by the intake flow for recovering energy in the throttling mode, and it is reliable.

Moreover, by providing the displacement machine as a rotary roots type blower, flow metering will be available as the volume flowing through the displacement machine may be derived from readily available data such as the displacement of the displacement machine, the speed of the displacement machine and the pressure and temperature of the intake flow to be metered. By this, for example, other means for measuring the volume of intake flow, such as a manifold absolute flow sensor (MAF sensor), may be omitted from the engine system. Alternatively, data indicative of flow of intake flow established by the displacement machine may be used to validate available data and/or provide fall back data for a dedicated arrangement for measuring volume of intake flow flowing into the engine.

In an embodiment, the operation of the displacement machine may be carried out while an entire flow of intake flow that is fed to the engine through the intake duct passes the inlet and the outlet of, and thus through, the displacement machine.

According to a second aspect the invention relates to a method of operating a four stroke internal combustion engine system, the engine system comprising: a four stroke internal combustion engine provided with an intake duct, a turbo compressor arranged to compress an intake flow in the intake duct, and a displacement machine provided in the intake duct downstream the turbo compressor, wherein the displacement machine is arranged to displace intake flow from an inlet to an outlet thereof. The method comprises the step of operating the displacement machine in a second mode (energy recovery and/or throttling mode) where a pressure ratio (PR) given by a pressure at the outlet of the displacement machine divided by a pressure at the inlet of the displacement machine is below 1.

In an embodiment the method comprises the steps of: driving the displacement machine at least partly by means of the intake flow flowing through the intake duct and recovering energy transferred from the intake flow to the displacement machine while driving the displacement machine.

In an embodiment the step of recovering the transferred energy comprises the step of: converting the recovered energy to electric energy and use the electric energy for driving electric equipment or for charging an electric storage unit; or using the recovered energy for adding driving power to a crankshaft of the engine.

In an embodiment the displacement machine is arranged to be driven by means of a drive arrangement, wherein the drive arrangement is configured to generate a power output when driven by the displacement machine.

In an embodiment the method comprises the step of operating the internal combustion engine system in a boost assist mode by driving the displacement machine by the drive arrangement in a third mode to increase intake pressure such that a pressure ratio given by a pressure at the outlet of the displacement machine divided by a pressure at the inlet of the displacement machine is above 1. Boost assist may be desirable for many reasons; examples being that boost assist may increase any already available boost generated by the turbocharger compressor. Another example is that boost assist may allow for efficient operation of the turbocharger compressor as the displacement machine may be driven such that the turbocharger compressor continuously works in efficient operating conditions.

In an embodiment, the displacement machine may be driven in variable speed selected or controlled by the control unit in accordance with a boost assist requirement.

In a further aspect of the invention the object is achieved by means of a four stroke internal combustion engine system comprising: a four stroke internal combustion engine provided with an intake duct, a turbo compressor arranged to compress intake flow in the intake duct, and a displacement machine provided in the intake duct downstream the turbo compressor, wherein the displacement machine is arranged to displace intake flow from an inlet to an outlet thereof and to be driven at different drive levels by means of a controllable drive arrangement. The drive arrangement is configured to generate a power output when driven by the displacement machine and in that the engine system is configured to drive the displacement machine at least partly by means of the intake flow flowing through the intake duct and to recover energy transferred from the intake flow to the displacement machine while driving the displacement machine so as to provide a power output from the drive arrangement.

In an embodiment the engine system is configured to convert the recovered energy to electric energy and use the electric energy for i) driving electric equipment or for charging an electric storage and/or for ii) adding driving power to a crankshaft of the engine.

In an embodiment the displacement machine is a rotary roots type blower having a pair of rotary members provided with meshing lobes.

In an embodiment the engine system comprises a control unit configured to control the steps of the method above.

In a further aspect of the invention the object is achieved by means of a vehicle comprising a four stroke internal combustion engine system according to above.

In a further aspect of the invention the object is achieved by means of:
- A computer program product comprising program code means for performing the above method steps when said program is run on a computer; or
- A computer readable medium carrying a computer program comprising program code means for performing the above method steps when said program product is run on a computer; or
- A control unit for controlling a four stroke internal combustion engine system, the control unit being configured to perform the above steps of the method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
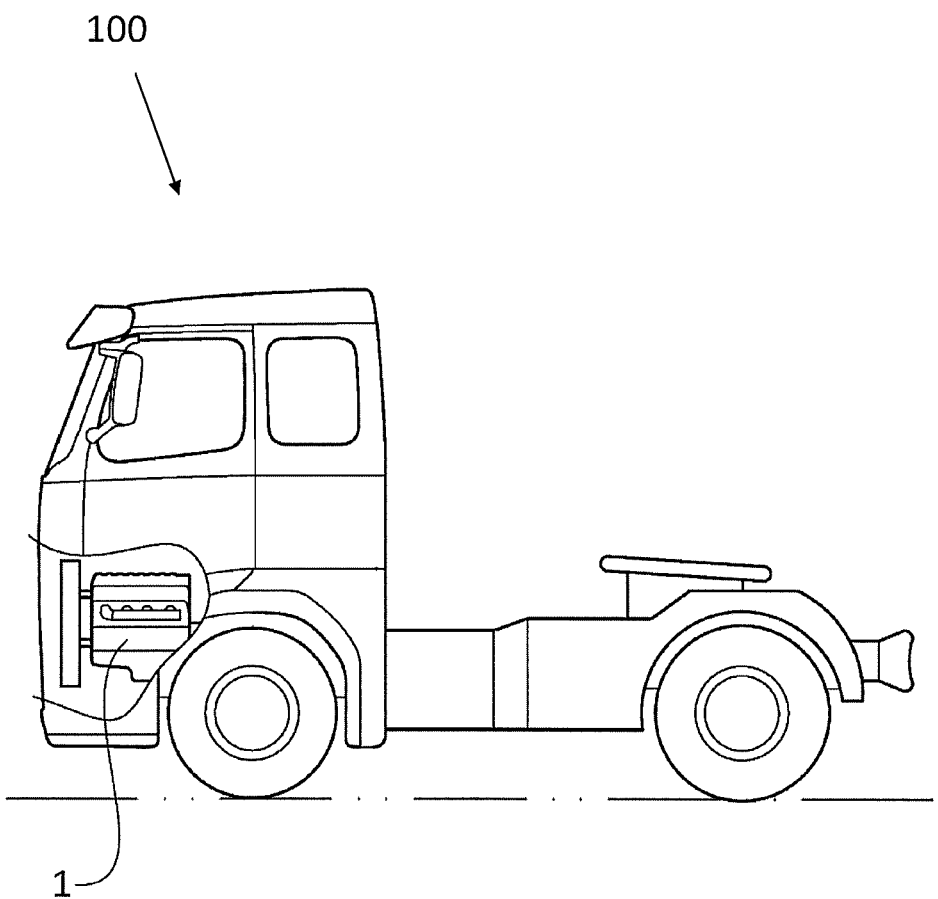
FIG. 1 shows a truck provided with a four stroke internal combustion engine system according to the invention.

FIG. 1 shows a schematic view of a truck 100 provided with a four stroke internal combustion engine system 1 arranged for propulsion of the truck 100 by means of a driveline (not shown). An example of the invention will be described in relation to the engine system 1.

FIG. 1 is primarily intended to exemplify a vehicle and an engine system to which the invention can be applied. Since the engine system 1 described below contains only three cylinders and is rather small for powering a heavy-duty vehicle such as the truck 100, the engine system 1 is preferably a hybrid engine system comprising also means for driving the truck 100 electrically. Such hybrid engines are well known as such and are not described in any detail in this disclosure.

Figure 2:
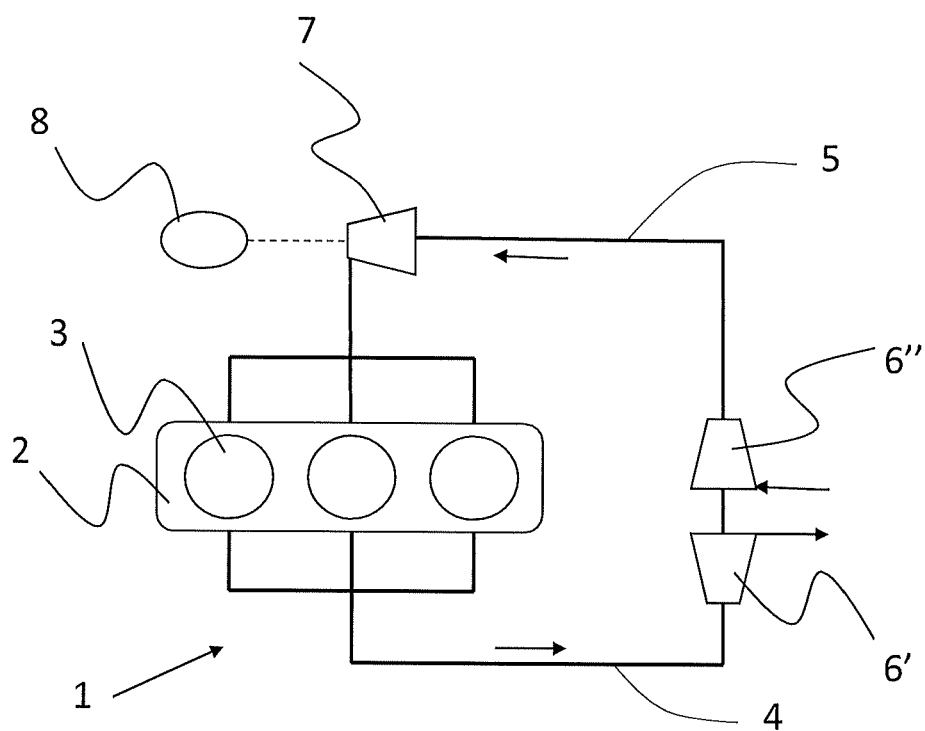
FIG. 2 schematically shows the main components of an example of a four stroke internal combustion engine system according to the invention.

FIG. 2 schematically shows the main components of an example of a four stroke internal combustion engine system 1 according to the invention. The engine system 1 comprises a four stroke internal combustion engine 2 (Otto or Diesel type) provided with three cylinders 3. Each cylinder 3 is provided with the following conventional details that are not shown in the figure: at least one intake valve for admitting intake flow into the cylinder, at least one exhaust valve for allowing exhaust gas to exit, means for introducing a fuel into the cylinder, and a piston arranged for reciprocating motion in the cylinder 3. The engine 2 also comprises, among other conventional parts, a crank shaft (not shown) connected to and driven by the pistons. The crank shaft is in turn connected to driving wheels of the truck 100 via a transmission driveline. In a hybrid engine system a complementing electric drive system is also provided.

The internal combustion engine system 1 further comprises an intake duct 5 for feeding intake flow to the cylinders 3 of the engine 2 and an exhaust duct 4 for feeding exhaust away from engine 2. A turbocharging arrangement comprising an exhaust turbine 6' connected to a turbo compressor 6" is arranged to use the energy of the exhaust gas to drive the turbine 6', which in turn drives the turbo compressor 6", which compresses the intake flow fed to the engine 2.

A displacement machine in the form of a roots blower 7 is provided in the intake duct 5 downstream the turbo compressor 6". The system 1 is arranged so that all intake flow, or essentially all intake flow, that flows through the intake duct 5 passes the displacement machine/roots blower 7.

The displacement machine/roots blower 7 has a pair of rotary members provided with meshing lobes and rather moves, or displaces, the intake flow than compresses it. Roots type blowers have been well known for a long time and have been used in connection with internal combustion engines before, however, arranged in a different manner and/or used for other purposes than disclosed here.

The displacement machine/roots blower 7 is arranged to be driven at different drive levels by means of a controllable drive arrangement in the form of an electric motor/generator 8. The electric motor/generator 8 may be configured also to work as an electric motor for driving the roots blower 7; possibly with variable speeds, or as an electric generator for producing electricity when the power goes in the opposite direction. When the rotary members of the roots blower 7 are rotated by some force, which in principle could be any force but which in this case is intended to be the force of intake flow flowing in the intake duct 5, the electric motor/generator 8 can thus produce electricity that may be used for different purposes, such as driving various electric equipment (e.g. electric driving units in a hybrid vehicle) or charging an electric storage, such as a battery.

The displacement machine 7 may be operative to act also as engine throttling device thereby allowing for omission of an intake throttle. This is made possible as the displacement machine 7 can be variably operated to restrict the flow of intake flow in a manner similar to a throttle device. In such mode, increased volume flow after compared to before the displacement machine 7 will occur.

Figure 3:
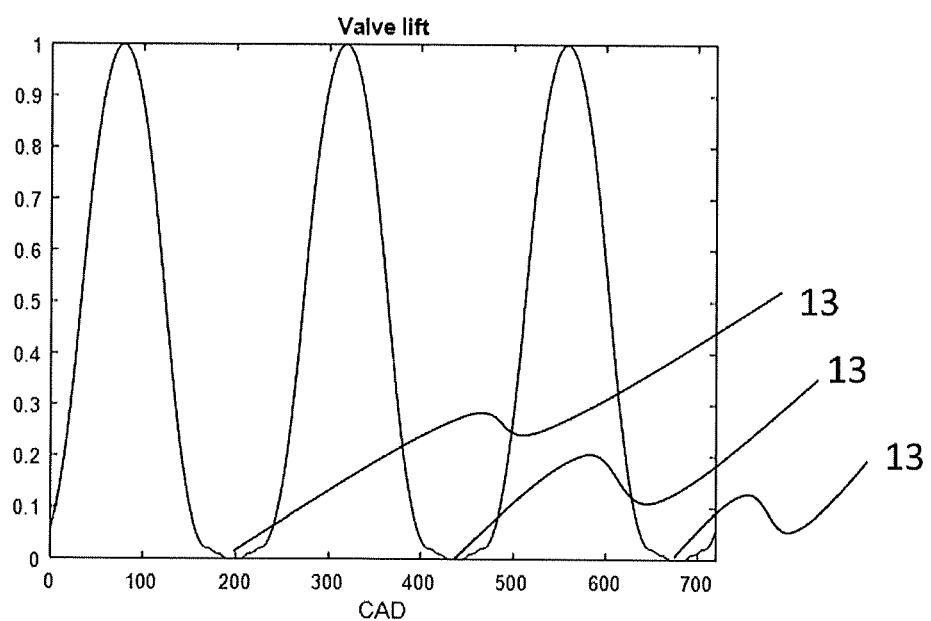
FIG. 3 graphically shows valve lift of the intake valves in an engine provided with three cylinders as a function of crank angle degree (CAD).

FIG. 3 shows a valve lift of the intake valves in a three cylinder engine as a function of crank angle degree (CAD). As shown in FIG. 3, the three valves are fully open at around 80, 320 and 560 CAD and there are time periods at around 200, 440 and 680 CAD, indicated by reference number 13, during which all intake valves are closed (or very close to be closed). Pulses are generated by the engine 2 as a result of the opening and closing of the intake valves and move, or propagate, upstream in the intake duct 5. Since there in this case are periods during which all intake valves are closed, these pulses are stronger and/or more pronounced than for engines with e.g. 6, 8 or 12 cylinders where there always is at least one intake valve open. Also engines with four cylinders experience periods or at least instances where all intake valves are closed.

A main purpose of the displacement machine/roots blower 7 is to prevent these pulses to move through the intake duct 5 and reach the turbo compressor 6". A roots type blower has meshing lobes that fit tightly to each other and a very small gap between the lobes and a housing. The displacement machine/roots blower 7 is thus capable of passing through only intake flow that is intended to be passed/displaced through the machine and capable of preventing intake flow to pass through that is not intended to pass. The pulses generated in the engine 2 will therefore not pass the displacement machine/roots blower 7 on their way upstream in the intake duct 5.

The internal combustion engine system 1 further comprises a control system (not shown) including a control unit, engine data, sensors etc. configured to control the engine system 1.

As mentioned previously, normal operation of the engine 2 means that the engine 2 operates more or less in a steady-state mode with no significant desire of sudden large changes in intake flow, i.e. there is no sudden release of or press onto an accelerator pedal that would generate a control signal with such a significant desire (alternatively, there is no corresponding sudden control signal generated in a driverless vehicle without such a pedal).

During such a normal operation mode of the engine, the displacement machine/roots blower 7 is driven in a first mode so that the inlet and outlet pressures are (close to) equal, i.e. a pressure ratio (PR) given by an outlet pressure of the displacement machine 7 divided by an inlet pressure of the displacement machine 7 is substantially equal to 1. This means that the displacement machine/roots blower 7 works "in pace" with the turbo compressor 6" and the engine 2 and primarily has the function of a pulse dampening device without affecting the pressure in the intake duct 5.

In a throttling mode, for instance initiated by a control signal generated as a response to a sudden release of the accelerator pedal, the drive level of the displacement machine/roots blower 7 is set in a second mode (energy recovery mode) so that the outlet pressure is lower than the inlet pressure (PR below 1). Besides that the displacement machine/roots blower 7 continues to block the pulses, the pressure potential over the displacement machine/roots blower 7 can now be used to recover energy by driving the electric motor/generator 8 as an electric generator and producing electricity that can be used for different purposes as described above. Further, the displacement machine/roots blower 7 increases the back pressure for the turbo compressor 6" arranged upstream, which can be used to allow the turbo compressor 6" to operate in an operating point that is more favorable (as described previously).

In a boost assist mode, for instance initiated by a control signal generated as a response to a sudden press onto the accelerator pedal, the drive level of the displacement machine/roots blower 7 is set in a third mode so that the outlet pressure is higher than the inlet pressure (PR above 1). Besides that the displacement machine/roots blower 7 continues to block the pulses it can now be used to increase the pressure of the intake flow further, as a complement to the pressure increase generated by the turbo compressor 6". Also in this mode, the displacement machine/roots blower 7 can be used to let the turbo compressor 6" operate in an operating point that is more favorable (because the turbo compressor 6" does not necessarily have to reach the pressure peak since some of the pressure increase can be added by the machine 7 downstream).

Switching back to normal mode from throttling or boost assist mode is made when it is determined that the normal mode is desired.

Figure 4:
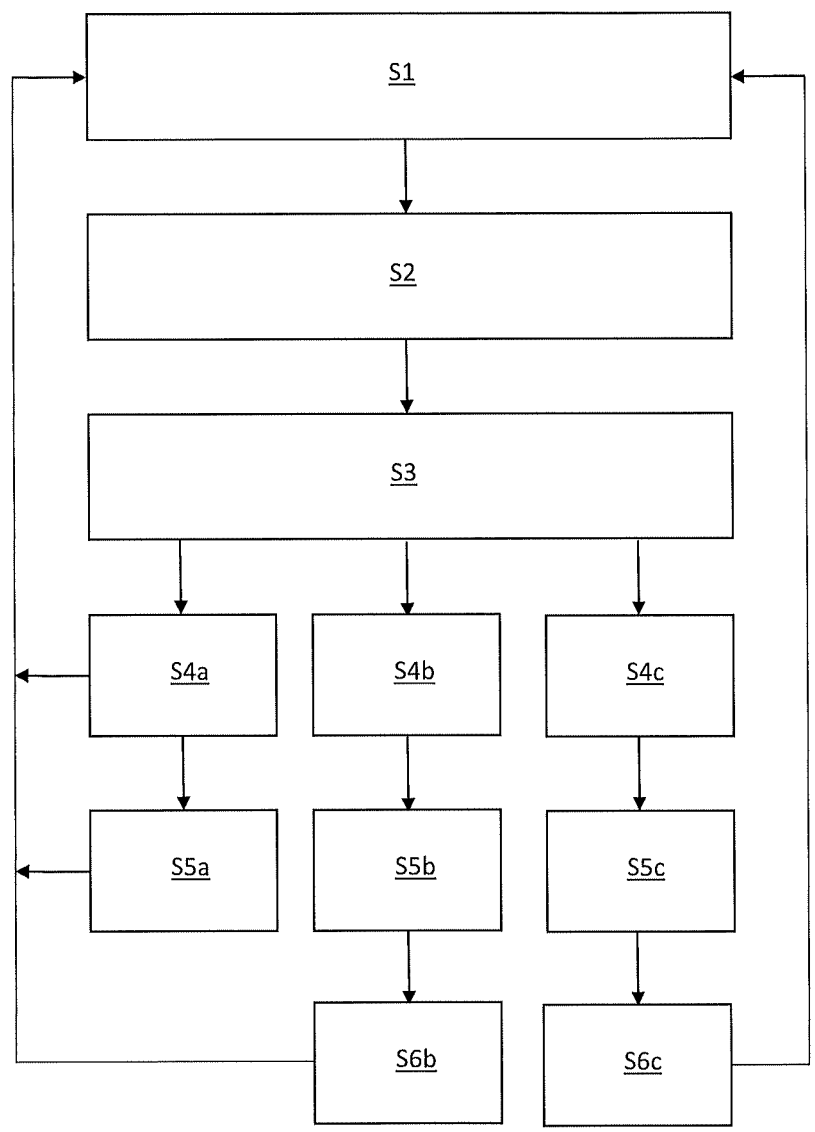
FIG. 4 shows an example of method steps according to the invention.

FIG. 4 shows an example of a method of operating the internal combustion engine system 1. The method includes the following steps:

Step S1: receiving a signal or data in the control unit representative of the desired mode of operation.

In an embodiment, the desired modes of operation may be any of following modes:

First mode: normal operation where PR is essentially 1,
Second mode: Energy recovery and/or throttling mode where PR is <1, and
Third mode: Boost assist mode where PR is >1

Step S2: receiving a signal or data in the control unit representative of the current drive mode.

Step S3: evaluating the signal or data representative of the desired mode of operation against (S1) against a signal or data representing the current drive mode (S2) and, in case of deviation, selecting one of three steps S4*a* (first mode), S4*b* (energy recovery and/or throttling mode) or S4*c* (boost assist mode) and proceed to the selected step. If the evaluation in step S3 confirms that the signal or data representative of the current drive mode (S2) meets the requirements of the signal or data representative of the desired mode of operation (S1), method may be configured for restarting the cycle by continuing to step S1.

Steps S2 and S3 may, in some embodiments, represent optional steps such that any desired mode of operation may be selected irrespective of current operating parameters.

In step S4a, the following sequence takes place:
Step S4a: switching operation to the first mode (PR=1)
Step S5a: operating the displacement machine 7 in the first mode with PR=1 and returning to step S1.

Operation of the displacement machine at PR=1 can, as previously mentioned, be performed in any operation mode of the internal combustion engine including in steady state-like operation, in a throttling mode as well as in a TC-boost mode where the displacement machine 7 simply conveys boost delivered by means of boost means provided upstream the displacement machine 7.

In step S4b, the following sequence takes place:
Step S4b: switching operation mode to the second mode (energy recovery and/or throttling mode, PR<1),
Step S5b: driving the displacement machine 7 by means of intake flow flowing through the intake duct 5 and the displacement machine 7 thereby, optionally, recovering energy transferred from the intake flow to the displacement machine 7, and
Step S6b: optionally driving the electric motor/generator 8 for producing electricity by means of the energy recovered in step S5b and returning to step S1. If energy recovery is not active, the motor/generator 8 will act to control the speed of the displacement machine 7.

In step S4c, the following sequence takes place:
Step S4c: switching operation mode to boost assist mode (PR>1)
Step S5c: driving the electric motor/generator 8 to drive the displacement machine 7
Step S6c: operating the displacement machine 7 in boost assist mode with PR>1 and returning to step S1.

Steps S5c and S6c may include sub-steps of setting and controlling the magnitude of boost assist provided by the displacement machine 7 by variably controlling the speed of the displacement machine 7.

The steps are controlled by the control unit based on various inputs. Typically, the control unit determines and decides what is "desired" based on all information it already has and all information it continuously receives from various sensors etc. The control unit controls of course also a number of other steps and functions that form part of conventional engine controlling and which therefore are not described in detail here. For instance, fuel injection and speed of turbo compressor are also typically controlled as a response to change of engine mode.

It is to be understood that the present invention is not limited to the embodiments described above and illustrated in the drawings; rather, the skilled person will recognize that many changes and modifications may be made within the scope of the appended claims.

For instance, the engine system 1 may be provided with further components not shown in FIG. 2, such as a waste gate, sensors, an EGR system (exhaust gas recirculation system), fuel injectors, valves, etc. Further, an intake flow charge cooler may be arranged in the intake duct 5, either upstream or downstream the displacement device 7, and the controllable drive arrangement 8 might instead be mechanical or hydraulic. Moreover, the displacement machine 7 need not necessarily to be a roots blower but could be another type of displacement machine capable of dampening the pressure pulses and of being controlled in line with the mentioned pressure ratios (PR).

As to the method it is, for instance, possible to use the recovered energy for adding driving power via mechanical or hydraulic power line of a crankshaft of the engine.

The invention claimed is:

1. A method of operating a four stroke internal combustion engine system, the engine system comprising:
a four stroke internal combustion engine provided with an intake duct,
a turbo compressor arranged to compress intake flow in the intake duct, and
a displacement machine provided in the intake duct downstream the turbo compressor, wherein
the displacement machine is arranged to displace intake flow from an inlet to an outlet thereof, wherein the method comprises:
determining engine system operating conditions;
operating the displacement machine in a first mode where a pressure ratio given by a pressure at the outlet of the displacement machine divided by a pressure at the inlet of the displacement machine is substantially equal to 1; and wherein the operation of the displacement machine is carried out while an entire flow of intake flow that is fed to the engine through the intake duct passes through the displacement machine via its inlet and outlet.

2. Method according to claim 1, wherein the method comprises the step of:
switching operation mode of the displacement machine and operating the displacement machine in a second mode where the pressure ratio is below 1.

3. Method according to claim 1, wherein the method comprises the step of:
switching operation mode of the displacement machine and operating the displacement machine in a third mode where the pressure ratio is above 1.

4. Method according to claim 1, wherein the method comprises the step of switching operation mode of the displacement machine based on an operating mode of the internal combustion engine.

5. Method according to claim 1, wherein the method comprises the steps of:
operating the engine in a normal operation mode and operating the displacement machine in the first mode;
receiving a signal in a control unit that a desired magnitude of an intake flow to be fed to the engine is significantly smaller than the intake flow fed to the engine during the normal operation mode;
switching operation mode of the displacement machine and operating the displacement machine in a second mode where the pressure ratio is below 1.

6. Method according to claim 1, wherein the method comprises the steps of:
operating the engine in a normal operation mode and operating the displacement machine in the first mode;
receiving a signal in a control unit that a desired magnitude of an intake flow to be fed to the engine is significantly larger than the intake flow fed to the engine during the normal operation mode;
switching operation mode of the displacement machine and operating the displacement machine in a third mode where the pressure ratio is above 1.

7. Method according to claim 5, wherein the normal operation mode of the engine is a steady-state-like operation mode where there are no significant transients with regard to desired changes in engine speed or load so that there are no control signals generated or received concerning significant changes of the magnitude of the intake flow fed to the engine.

8. Method according to claim 2, wherein the step of operating the displacement machine in the second mode comprises the steps of:
   driving the displacement machine at least partly by means of the intake flow flowing through the intake duct, and
   recovering energy transferred from the intake flow to the displacement machine while driving the displacement machine.

9. Method according to claim 8, wherein the step of recovering the transferred energy comprises the step of:
   converting the recovered energy to electric energy and use the electric energy for driving electric equipment or for charging an electric storage; or
   using the recovered energy for adding driving power to a crankshaft of the engine.

10. Method according to claim 1, wherein the displacement machine is arranged to be driven at different drive levels by means of a controllable drive arrangement and wherein the step of operating the displacement machine comprises the step of setting a drive level of the displacement machine depending on engine operating mode.

11. Method according to claim 10, wherein the drive arrangement is configured to generate a power output when driven by the displacement machine.

12. Method according to claim 1, wherein the step of operating the displacement machine comprises the step of setting a drive level of an electric motor arranged to drive the displacement machine.

13. Method according to claim 1, wherein the displacement machine comprises at least one rotary member, wherein the step of operating the displacement machine comprises the step of setting a drive speed of the rotary member.

14. Method according to claim 1, wherein the displacement machine is a rotary roots blower having a pair of rotary members provided with meshing lobes.

15. Method according to claim 1, wherein the method includes a step of operating the internal combustion engine system in a boost assist mode by driving the displacement machine by the drive arrangement in a third mode to increase intake pressure such that a pressure ratio given by a pressure at the outlet of the displacement machine divided by a pressure at the inlet of the displacement machine is above 1.

16. Method according to claim 15 wherein the displacement machine is driven in variable speed and wherein the speed is selected or controlled by the control unit in accordance with a boost assist requirement.

17. A computer program product comprising program code means for performing the method according to claim 1 when said program is run on a computer.

18. A compute readable medium carrying a computer program comprising program code means for performing the method according to claim 1 when said program product is run on a computer.

19. A control unit for controlling a four stroke internal combustion engine system, the control unit being configured to perform the method according to claim 1.

* * * * *